US009898870B2

(12) United States Patent
Narayanan

(10) Patent No.: US 9,898,870 B2
(45) Date of Patent: *Feb. 20, 2018

(54) TECHNIQUES TO PRESENT LOCATION INFORMATION FOR SOCIAL NETWORKS USING AUGMENTED REALITY

(71) Applicant: Microsoft Technology Licensing, LLC, Redmond, WA (US)

(72) Inventor: Harishkumar Narayanan, Seattle, WA (US)

(73) Assignee: MICORSOFT TECHNOLOGIES LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,574

(22) Filed: May 24, 2016

(65) Prior Publication Data
US 2016/0267719 A1    Sep. 15, 2016

Related U.S. Application Data

(63) Continuation of application No. 12/817,969, filed on Jun. 17, 2010, now Pat. No. 9,361,729.

(51) Int. Cl.
*G09G 5/00* (2006.01)
*G06T 19/00* (2011.01)
(Continued)

(52) U.S. Cl.
CPC ........ *G06T 19/006* (2013.01); *G06F 3/04842* (2013.01); *G06T 11/60* (2013.01);
(Continued)

(58) Field of Classification Search
CPC ....... G06T 19/006; G06T 19/00; G06F 3/011; G06F 3/012; G02B 27/017
See application file for complete search history.

(56) References Cited

U.S. PATENT DOCUMENTS

| 6,891,518 B2 | 5/2005 | Sauer et al. |
| 7,868,904 B2 | 1/2011 | Morita et al. |
| (Continued) | | |

FOREIGN PATENT DOCUMENTS

WO    2009067795    6/2009

OTHER PUBLICATIONS

Mischler, Antoine, "3D Reconstruction from Depth and Stereo Images for Augmented Reality Applications", Institute for Computer Engineering, Computer Graphics Group, Dec. 11, 2007, 98 pages.

(Continued)

*Primary Examiner* — Abderrahim Merouan

(57) ABSTRACT

Techniques to present location information using augmented reality are described. An apparatus may comprise an augmentation system operative to augment an image with information for an individual, the image having a virtual object representing a real object. The augmentation system may comprise a location component operative to determine location information for the real object, a virtual information component operative to retrieve location information for an individual, and a proximity component operative to determine whether location information for the real object substantially matches location information for the individual. The augmentation system may further comprise an augmentation component operative to augment the virtual object with information for the individual to form an augmented object when the location information for the real object substantially matches the location information for the individual. Other embodiments are described and claimed.

20 Claims, 9 Drawing Sheets

(51) Int. Cl.
    *G06F 3/0484*  (2013.01)
    *G06T 11/60*   (2006.01)
    *H04L 12/58*   (2006.01)
    *H04L 29/08*   (2006.01)
    *H04L 29/06*   (2006.01)
    *G06F 3/01*    (2006.01)
    *G02B 27/01*   (2006.01)

(52) U.S. Cl.
    CPC .............. *H04L 51/32* (2013.01); *H04L 67/18* (2013.01); *H04L 67/38* (2013.01); *G02B 27/017* (2013.01); *G06F 3/011* (2013.01); *G06F 3/012* (2013.01); *G06T 19/00* (2013.01)

(56) References Cited

U.S. PATENT DOCUMENTS

| | | | |
|---|---|---|---|
| 8,280,112 B2 | 10/2012 | Casamona et al. | |
| 8,327,279 B2 | 12/2012 | Yamamoto et al. | |
| 8,819,726 B2* | 8/2014 | Wetzer | H04N 21/25816 705/14.27 |
| 8,922,650 B2* | 12/2014 | Clapp | G06F 17/30796 348/143 |
| 2002/0061741 A1 | 5/2002 | Leung et al. | |
| 2004/0105573 A1 | 6/2004 | Neumann et al. | |
| 2004/0193441 A1* | 9/2004 | Altieri | G06Q 30/02 709/203 |
| 2006/0262140 A1 | 11/2006 | Kujawa et al. | |
| 2007/0035562 A1* | 2/2007 | Azuma | G03B 13/28 345/633 |
| 2007/0038944 A1* | 2/2007 | Carignano | G06T 15/20 715/757 |
| 2007/0050129 A1* | 3/2007 | Salmre | G01C 21/20 701/408 |
| 2008/0060034 A1 | 3/2008 | Egnal et al. | |
| 2008/0133336 A1* | 6/2008 | Altman | G06Q 30/0207 455/456.1 |
| 2008/0147730 A1* | 6/2008 | Lee | G06Q 30/0212 |
| 2008/0150963 A1 | 6/2008 | Stambaugh | |
| 2008/0186165 A1* | 8/2008 | Bertagna | G08B 21/0227 340/539.13 |
| 2008/0263446 A1 | 10/2008 | Altberg et al. | |
| 2008/0263458 A1 | 10/2008 | Altberg et al. | |
| 2008/0268876 A1 | 10/2008 | Gelfand | |
| 2009/0005981 A1* | 1/2009 | Forstall | G01C 21/20 701/431 |
| 2009/0158206 A1* | 6/2009 | Myllyla | G11B 27/105 715/804 |
| 2009/0167787 A1 | 7/2009 | Bathiche et al. | |
| 2009/0232354 A1* | 9/2009 | Camp, Jr. | G06Q 30/02 382/103 |
| 2009/0240426 A1 | 9/2009 | Akita et al. | |
| 2009/0315740 A1 | 12/2009 | Hildreth et al. | |
| 2010/0023878 A1* | 1/2010 | Douris | H04L 12/6418 715/757 |
| 2010/0033404 A1 | 2/2010 | Hamadou et al. | |
| 2010/0066642 A1 | 3/2010 | Fuller et al. | |
| 2010/0076777 A1 | 3/2010 | Paretti et al. | |
| 2010/0077484 A1 | 3/2010 | Paretti et al. | |
| 2010/0124363 A1 | 5/2010 | Ek et al. | |
| 2010/0208033 A1 | 8/2010 | Edge et al. | |
| 2010/0249957 A1 | 9/2010 | Price | |
| 2011/0141254 A1 | 6/2011 | Roebke et al. | |
| 2011/0164163 A1* | 7/2011 | Bilbrey | G06F 1/1694 348/333.01 |
| 2011/0252320 A1* | 10/2011 | Arrasvuori | G06F 1/1626 715/704 |
| 2012/0075285 A1* | 3/2012 | Oyagi | G06T 19/006 345/419 |
| 2012/0105474 A1* | 5/2012 | Cudalbu | H04W 4/02 345/633 |
| 2012/0105476 A1* | 5/2012 | Tseng | G01C 21/3611 345/633 |
| 2013/0073637 A1 | 3/2013 | Kim | |
| 2013/0124075 A1 | 5/2013 | Rothschild | |

OTHER PUBLICATIONS

"11 of the Best Augmented Reality Apps for the iPhone / Android Smartphones!", Jan. 22, 2010, 13 pages, (author unknown).

Montgomery, Justin, "Augmented Reality: The Future of Mobile Marketing?", Aug. 27, 2009, 4 pages. http://http://www.mobilemarketingwatch.com/augmented-reality-the-future-o- f-mobile-marketing-3799/.

Dixon, Douglas, "Augmented Reality Goes Mobile", Manifest Technology: Making Sense of Digital Media Technology, Feb. 2010, 6 pages.

Haseman, Chris, "Augmented Reality on Android: Using GPS and the Accelerometer", Oct. 10, 2009, 3 pages.

Cohen, et al., "Core Tools for Augmented Reality", Microsoft Research, retrieved Mar. 25, 2010, 1 page.

Megna, Michelle, "Mobile's Next Big Thing: Augmented Reality", Sep. 18, 2009, 4 pages.

* cited by examiner

600

- RECEIVE AN IMAGE HAVING A VIRTUAL OBJECT REPRESENTING A REAL OBJECT
  602
- DETERMINE LOCATION INFORMATION FOR THE REAL OBJECT IN THE IMAGE
  604
- RETRIEVE LOCATION INFORMATION FOR AN INDIVIDUAL
  606
- DETERMINE WHEN THE LOCATION INFORMATION FOR THE REAL OBJECT SUBSTANTIALLY MATCHES THE LOCATION INFORMATION FOR THE INDIVIDUAL
  608
- AUGMENT THE VIRTUAL OBJECT WITH INFORMATION FOR THE INDIVIDUAL TO FORM AN AUGMENTED OBJECT
  610

*FIG. 6*

TECHNIQUES TO PRESENT LOCATION INFORMATION FOR SOCIAL NETWORKS USING AUGMENTED REALITY

CROSS-REFERENCE TO RELATED APPLICATION

This application is a continuation of, claims the benefit of and priority to, previously filed U.S. patent application Ser. No. 12/817,969 entitled "Techniques to Present Location Information for Social Networks Using Augmented Reality" filed on Jun. 17, 2010, the subject matter of which is hereby incorporated in its entirety.

BACKGROUND

Online services have led to generation and storage of vast amounts of information accessible via a network. For instance, popular and fast-growing social networking systems (SNS) allow members to author and publish information about themselves for consumption by other members. As online information grows, new techniques are needed for human-computer interaction to allow a user to organize and access computerized information in a meaningful way. Further, techniques are needed to match current user lifestyles, typically characterized by speed, mobility and convenience.

One class of technology potentially capable of providing such advantages is referred to as "Augmented Reality." Augmented reality attempts to merge or "augment" a physical environment with a virtual environment to enhance user experience in real-time. Augmented reality techniques may be used to overlay useful computer-generated information over images of a real-world environment. Augmented reality techniques employ the use of video imagery of a physical real-world environment which is digitally processed and modified with the addition of computer-generated information and graphics. For example, a conventional augmented reality system may employ specially-designed translucent goggles that enable a user to see the real world as well as computer-generated images projected over the real world vision. Other common uses of augmented reality systems are demonstrated through professional sports, where augmented reality techniques are used to project virtual advertisements upon a playing field or court, first down or line of scrimmage markers upon a football field, or a "tail" following behind a hockey puck showing a location and direction of the hockey puck.

Although developing quickly, advancement of augmented reality techniques have not yet matched the speed of evolution for other online services, such as SNS services. This technology gap provides a substantial need for enhanced augmented reality techniques capable of allowing a user to access growing volumes of online information in an efficient and effective manner. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to present location information using an augmented reality system. Some embodiments are particularly directed to techniques to augment or modify an image having virtual objects representing real objects from a real-world environment with information for one or more individuals. Examples of information may include without limitation location information and/or contact information, among other types of useful information.

In one embodiment, for example, an apparatus may comprise an augmentation system operative to augment an image with information for an individual, the image having a virtual object representing a real object. The augmentation system may comprise a location component operative to determine location information for the real object, a virtual information component operative to retrieve location information for an individual, and a proximity component operative to determine whether location information for the real object substantially matches location information for the individual. The augmentation system may further comprise an augmentation component operative to augment the virtual object with information for the individual to form an augmented object when the location information for the real object substantially matches the location information for the individual. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of a logic flow for an augmentation system.

DETAILED DESCRIPTION

Various embodiments are generally directed to techniques to present information about one or more individuals using an augmented reality system. Some embodiments are particularly directed to techniques to augment or modify an image having virtual objects representing real objects from a real-world environment with information for one or more individuals. Examples of information may include without limitation location information and/or contact information for an individual, among other types of information. In this manner, a user may receive a real-world image, and view location and contact information for individuals located within the real-world image in real-time. For instance, a user may utilize a mobile device to record still images (e.g., photographs) or moving images (e.g., video) of a city street, and present the still or moving images on a display with location information and/or contact information for individuals currently located within a building, vehicle or other physical object captured with the image. Furthermore, the mobile device may track an individual as they move within the captured images. A user may then select contact information for an individual directly from the display using an input device (e.g., a touch-screen or pointer) to initiate communications with the individual. As a result, the embodiments can improve affordability, scalability, modularity, extendibility, or interoperability for an operator, device or network.

Figure 1:
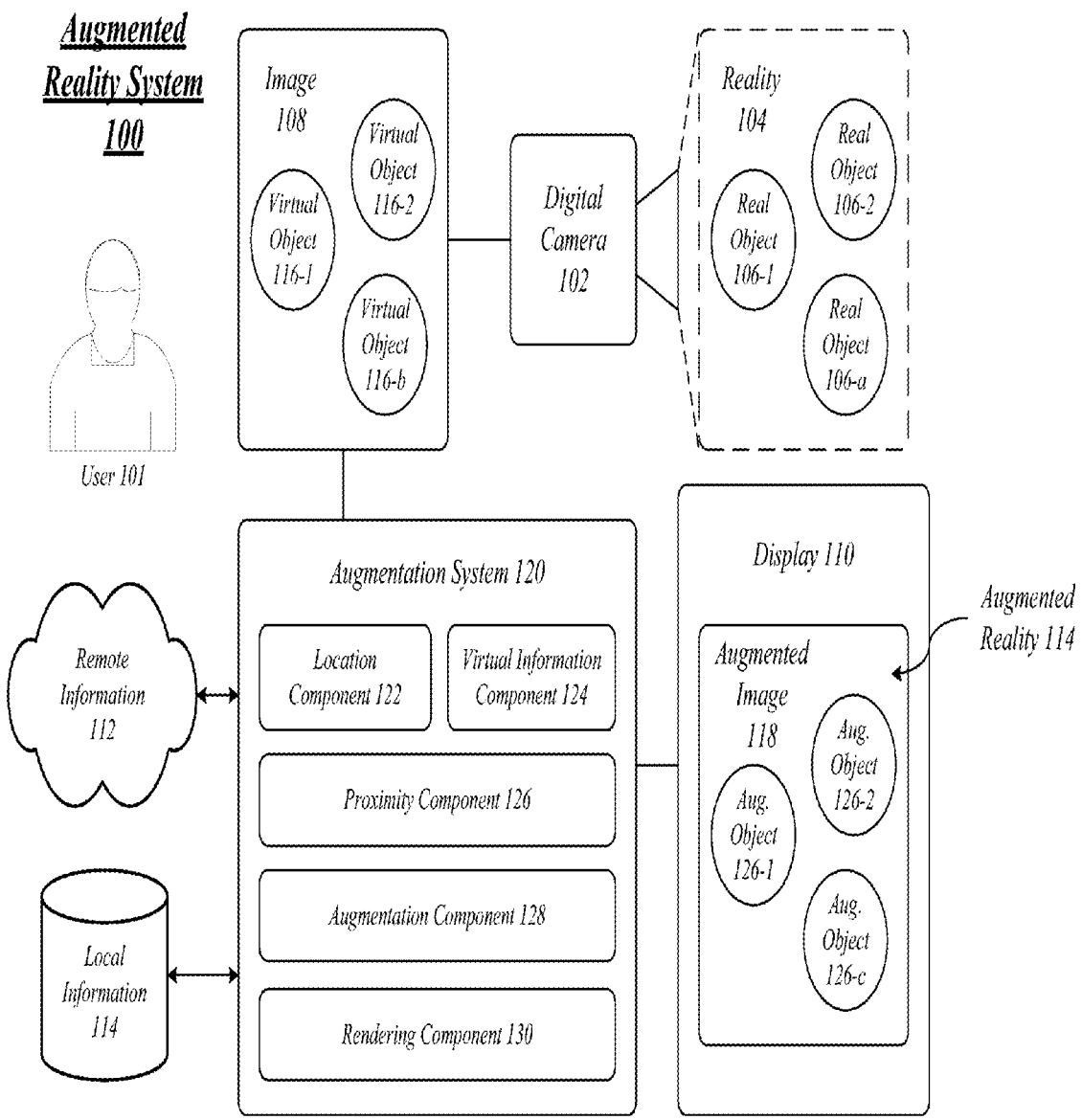
FIG. 1 illustrates an embodiment of an augmented reality system.

FIG. 1 illustrates a block diagram for an augmented reality system 100. In one embodiment, for example, the augmented reality system 100 may comprise an augmentation system 120. In one embodiment, the augmentation system 120 may comprise a computer-implemented system having multiple components 122, 124, 126, 128 and 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the augmented reality system 100 and/or the augmentation system 120 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the augmented reality system 100 as shown in FIG. 1 has a limited number of elements in a certain topology, it may be appreciated that the augmented reality system 100 may include more or less elements in alternate topologies as desired for a given implementation.

The components 122, 124, 126, 128 and 130 may be communicatively coupled via various types of communications media. The components 122, 124, 126, 128 and 130 may coordinate operations between each other. The coordination may involve the uni-directional or bi-directional exchange of information. For instance, the components 122, 124, 126, 128 and 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In the illustrated embodiment shown in FIG. 1, the augmented reality system 100 may comprise a digital camera 102, an augmentation system 120 and a display 110. The augmented reality system 100 may further comprise other elements typically found in an augmented reality system or an electronic device, such as computing components, communications components, power supplies, input devices, output devices, and so forth. The embodiments are not limited in this context.

The digital camera 102 may comprise any camera designed for digitally capturing still or moving images (e.g., pictures or video) using an electronic image sensor. An electronic image sensor is a device that converts an optical image to an electrical signal, such as a charge-coupled device (CCD) or a complementary metal-oxide-semiconductor (CMOS) active-pixel sensor. The digital camera 102 may also be capable of recording sound as well. The digital camera 102 may offer any technical features typically implemented for a digital camera, such as built-in flash, zoom, autofocus, live preview, and so forth.

The display 110 may comprise any electronic display for presentation of visual, tactile or auditive information. Examples for the display 110 may include without limitation a cathode ray tube (CRT), bistable display, electronic paper, nixie tube, vector display, a flat panel display, a vacuum fluorescent display, a light-emitting diode (LED) display, electroluminescent (ELD) display, a plasma display panel (PDP), a liquid crystal display (LCD), a thin-film transistor (TFT) display, an organic light-emitting diode (OLED) display, a surface-conduction electron-emitter display (SED), a laser television, carbon nanotubes, nanocrystal displays, a head-mounted display, and so any other displays consistent with the described embodiments. In one embodiment, the display 110 may be implemented as a touchscreen display. A touchscreen display is an electronic visual display that can detect the presence and location of a touch within the display area. The touch may be from a finger, hand, stylus, light pen, and so forth. The embodiments are not limited in this context.

A user 101 may utilize the digital camera 102 to capture or record still or moving images 108 of a real-world environment referred to herein as reality 104. The reality 104 may comprise one or more real objects 106-1-$a$. Examples of real objects 106-1-$a$ may include any real-world objects, including buildings, vehicles, people, and so forth. The digital camera 102 may capture or record the reality 104 and generate the image 108. The image 108 may comprise one or more virtual objects 116-1-$b$. Each of the virtual objects 116-1-$b$ may comprise a digital or electronic representation of a corresponding real object 106-1-$a$. For instance, a real object 106-1 may comprise a building while a virtual object 116-1 may comprise a virtual representation of the building. The image 108 may be used as input for the augmentation system 120.

It is worthy to note that "a" and "b" and "c" and similar designators as used herein are intended to be variables representing any positive integer. Thus, for example, if an implementation sets a value for a=5, then a complete set of real objects 106-1-$a$ may include real objects 106-1, 106-2, 106-3, 106-4 and 106-5. The embodiments are not limited in this context.

In various embodiments, the augmentation system 120 may be generally arranged to receive and augment one or more images 108 with computer-generated information for one or more individuals to form one or more augmented images 118. The augmentation system 120 may implement various augmented reality techniques to overlay, annotate, modify or otherwise augment an image 108 having virtual objects 116-1-*b* representing real objects 106-1-*a* from a real-world environment such as reality 104 with information for one or more individuals. Examples of information may include without limitation location information for an individual, contact information for an individual, a combination of location information and contact information, and other types of virtual information specific to an individual. In this manner, a user 101 may receive a real-world image as represented by the reality 104 and captured by the digital camera 102, and view location and contact information for individuals located within the real-world image in real-time. For instance, a user may utilize a client mobile device to record still images (e.g., photographs) or moving images (e.g., video) of an urban or suburban street, and present the still or moving images on a display with location information and/or contact information for individuals currently located within a building, vehicle or other physical objects captured within frame boundaries of the image 108. Furthermore, a client mobile device may track an individual as they move within the captured images 108. The augmentation system 120 may selectively display contact information for an individual, including presence information. The user 101 may then select a given type of contact information (e.g., a phone number, IM address, etc.) for an individual directly from the display using an input device (e.g., a touchscreen or pointer) to initiate communications with the individual. For instance, selecting a type of contact information may launch a communications application (e.g., a phone application, a messaging application, etc.) to establish a communications connection with a device used by the individual.

In various embodiments, the augmentation system 120 may be generally arranged to receive and augment one or more images 108 with computer-generated information for one or more individuals. In one embodiment, the computer-generated information may be remote information 112 stored by a remote device accessible via a network. In one embodiment, the computer-generated information may be local information 114 stored by a local device implementing the augmentation system 120. As shown, the augmentation system may 120 may comprise a location component 122, a virtual information component 124, a proximity component 126, an augmentation component 128, and a rendering component 130.

The location component 122 may be generally arranged to determine location information on behalf of the augmentation system 120. In one embodiment, the location component 122 may determine location information representing a location for a real object 106-1-*a*. In one embodiment, the location component 122 may determine location information representing a location for a device implementing some or all of the augmented reality system 100, such as the augmentation system 120, for example. The location component 122 may determine the different types of location information using local resources (e.g., a global positioning system) or remote resources communicated as the remote information 112. The location information may comprise any type of location information used for navigating, including various types of information representing a physical three-dimensional location, such as latitude, longitude and altitude information. The location information may also comprise an associated time component, such as a current time.

The virtual information component 124 may be generally arranged to retrieve computer-generated information used for augmenting the image 108. In one embodiment, the virtual information component 124 may retrieve location information representing a previous, current or future location for an individual. In one embodiment, the virtual information component 124 may retrieve contact information for an individual. The virtual information component 124 may retrieve the computer-generated information from a remote device as the remote information 112, or from a local data store as the local information 114.

The proximity component 126 may be generally arranged to determine whether location information for a real object 106-1-*a* substantially matches previous, current or future location information for an individual. The proximity component 126 may compare location information for a real object 106-1-*a* and an individual to determine if there is some measure of overlap between physical locations for the real object 106-1-*a* and the individual. An amount of overlap may be determined using a proximity parameter. A proximity parameter is a configurable value representing a measure of distance between a location for a real object 106-1-*a* and an individual. The proximity component 126 may determine whether location information for a real object 106-1-*a* substantially matches previous, current or future location information for an individual, with "substantially matches" measured by a value set for the proximity parameter. For instance, the proximity parameter may be set to x meters (e.g., x=10 meters) or any other desired level of distance. As such, precision for the proximity component 126 may be varied based on a size of an individual or real object 106-1-*a*. For example, assume a real object 106-1 is a building, and the location information for the real object 106-1 is a center for the building. Further assume the proximity parameter is set to x=10 meters. The proximity component 126 may determine location information for the real object 106-1 substantially matches current location information for an individual when the individual is within 10 meters of the center of the building. The match may occur if the individual is currently located in an office of the building that is located within 10 meters from the center of the building, and the location information for the individual indicates the individual is within the office, for example.

The augmentation component 128 may be generally arranged to augment a virtual object 116-1-*b* of the image 108 with information for an individual to form an augmented object 126-1-*c*. In one embodiment, an augmented object 126-1-*c* may be formed based on output from the proximity component 126 indicating when location information for a real object 106-1-*a* substantially matches location information for an individual. The augmentation component 128 may receive and compile virtual information related to an individual as received from the virtual information component 124, and augment (or overlay) the virtual information upon appropriate virtual objects 116-1-*b* of the image 108 to form corresponding augmented objects 126-1-*c*. Various types of virtual information suitable for augmenting a virtual object 116-1-*b* may be described in more detail with reference to FIG. 2.

The rendering component 130 may render an augmented image 118 corresponding to an image 108 with augmented objects 126-1-*c*. The rendering component 130 may receive a set of augmented objects 126-1-*c* corresponding to some or all of the virtual objects 116-1-*b* of the image 108. The rendering component 130 may selectively replace certain virtual objects 116-1-*b* with corresponding augmented objects 126-1-*c*. For instance, assume the image 108 includes five virtual objects (e.g., b=5) comprising virtual objects 116-1, 116-2, 116-3, 116-4 and 116-5. Further assume the augmentation component 128 has augmented the virtual objects 116-2, 116-4 to form corresponding augmented objects 126-2, 126-4. The rendering component 130 may selectively replace the virtual objects 116-2, 116-4 of the image 108 with the corresponding augmented objects 126-2, 126-4 to form the augmented image 118.

In one embodiment, the rendering component 130 may render the augmented image 118 in a first viewing mode to include both virtual objects 116-1-*b* and augmented objects 126-1-*c*. Continuing with the previous example, the rendering component 130 may render the augmented image 118 to present the original virtual objects 116-1, 116-3, 116-5, and the augmented objects 126-2, 126-4. Additionally or alternatively, the augmented image 118 may draw viewer attention to the augmented objects 126-2, 126-4 using various GUI techniques, such as by graphically enhancing elements of the augmented objects 126-2, 126-4 (e.g., make them brighter), while subduing elements of the virtual objects 116-1, 116-3, 116-5 (e.g., make them dimmer or increase translucency). In this case, certain virtual objects 116-1-*b* and any augmented objects 126-1-*c* may be presented as part of the augmented image 118 on the display 110.

In one embodiment, the rendering component 130 may render the augmented image 118 in a second viewing mode to include only augmented objects 126-1-*c*. Continuing with the previous example, the rendering component 130 may render the augmented image 118 to present only the augmented objects 126-2, 126-4. This reduces an amount of information provided by the augmented image 118, thereby simplifying the augmented image 118 and allowing the user 101 to view only the pertinent augmented objects 126-1-*c*. Any virtual objects 116-1-*b* not replaced by augmented objects 126-1-*c* may be dimmed, made translucent, or eliminated completely from presentation within the augmented image 118, thereby effectively ensuring that only augmented objects 126-1-*c* are presented as part of the augmented image 118 on the display 110.

In one embodiment, the user 101 may selectively switch the rendering component 130 between the first and second viewing modes according to user preference.

Figure 2:
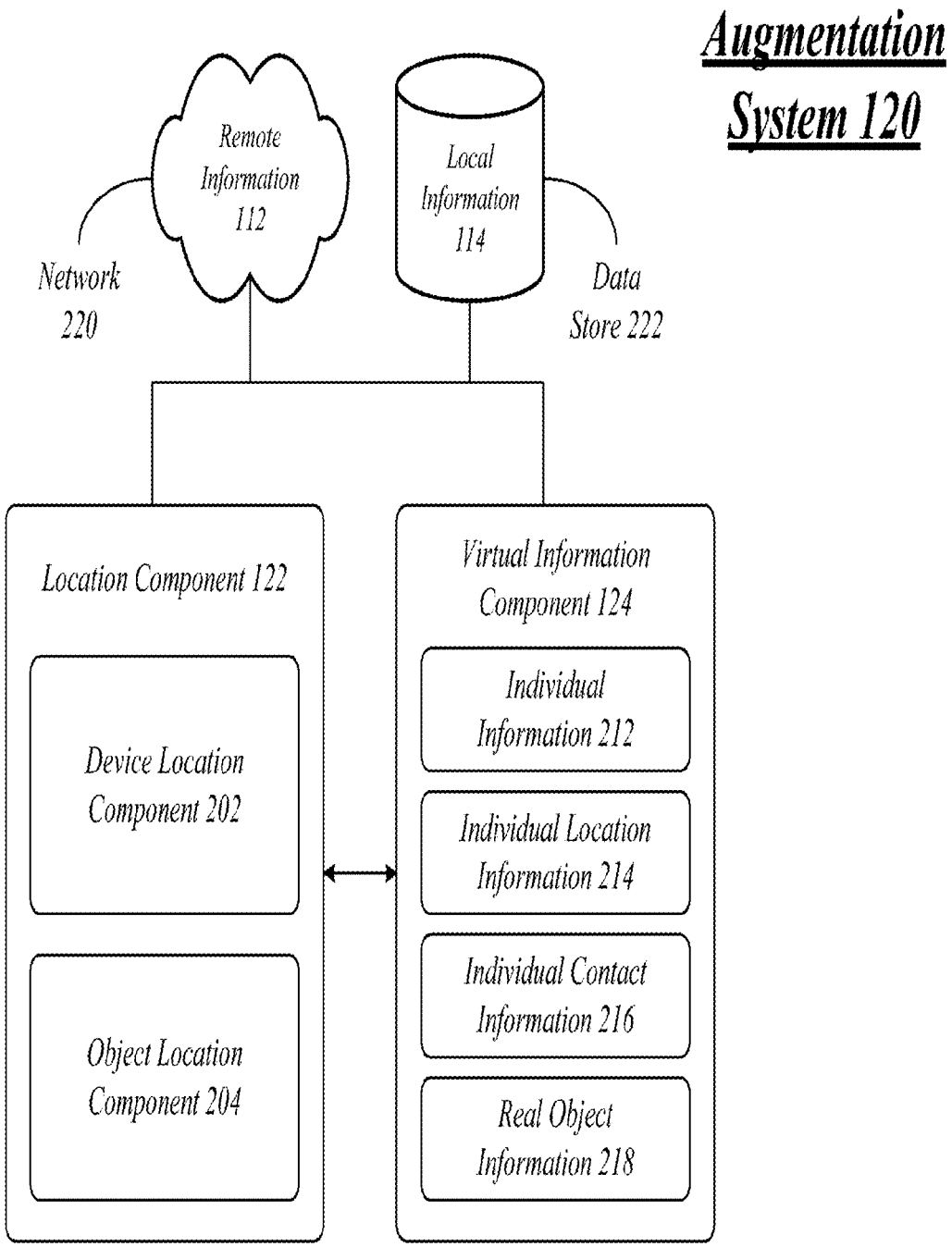
FIG. 2 illustrates an embodiment of an augmentation system.

FIG. 2 illustrates a more detailed block diagram of the augmentation system 120. More particularly, FIG. 2 illustrates the location component 122 having a device location component 202 and an object location component 204. FIG. 2 further illustrates the virtual information component 124 may comprise, store or retrieve different types of virtual information, including individual information 212, individual location information 214, individual contact information 216, and real object information 218.

The device location component 202 may determine device location information representing a location for a device implementing some or all of the augmented reality system 100, such as the augmentation system 120, for example. The device location component 202 may comprise or implement a positioning system to determine location of an object in space. In one embodiment, the device location component 202 may comprise or implement a positioning system to determine device location information implemented as a local resource on the device. In one embodiment, the device location component 202 may receive device location information as part of the remote information 112 from a positioning system implemented as a remote resource separate from a local device implementing some or all of the augmentation system 120. Examples for the device location component 202 may include without limitation a global navigation satellite system (GNSS), global positioning system (GPS), a compass navigation system, Galileo positioning system, a GLONASS system, a long range navigation (LORAN) system, an active bat system, a workspace system (e.g., for gaming systems), an inertial sensing system, a gyroscope, an accelerometer, a phase difference system, a direct field sensing system, a real-time location system, a mobile positioning system (e.g., base station triangulation), and so forth. The embodiments are not limited in this context.

The object location component 204 may determine object location information representing a location for an object in space, such as the real objects 106-1-*a* that are part of the reality 104, for example. In one embodiment, the object location component 204 may comprise or implement any of the positioning systems described with reference to the device location component 202. For instance, the object location component 204 may implement a GPS device to obtain device location information, and estimate distances to the real objects 106-1-*a* using various distance estimation techniques to obtain object location information. Examples of distance estimation techniques may be similar to those used for machine vision (MV) or computer vision, such as distance estimation techniques used to control automated guided vehicles (AGV), among others. In one embodiment, the object location component 204 may receive object location information for the real objects 106-1-*a* as part of the remote information 112. The embodiments are not limited in this context.

The virtual information component 124 may comprise, store or retrieve different types of virtual information used by the augmentation system 120. The virtual information may comprise the remote information 112 received via a network 220, the local information 114 stored by a data store 222, or a combination of the remote information and the local information 114. As shown, the virtual information component 124 may include individual information 212, individual location information 214, individual contact information 216, and real object information 218. However, it may be appreciated that the virtual information component 124 may comprise, store or retrieve other types of virtual information as desired for a given implementation of the augmentation system 120.

The individual information 212 may comprise any information about an individual. Examples of individual information 212 may include personal information such as identity information (e.g., first name, last name, maiden name, etc.), address information, subscription information, network information, subscription information to online services (e.g., a web service, a SNS, media sharing service, etc.), security information, authentication information, and any other individual information specific to an individual.

The individual location information 214 may comprise any information about a previous, current or future location for an individual. In one embodiment, the virtual information component 124 may receive individual location information as part of the remote information 112. Additionally or alternatively, the virtual information component 124 may generate individual location information utilizing the object location component 204 and one or more facial recognition techniques. As previously described, the object location component 204 may comprise or implement a positioning system to determine location of an object in space. In one embodiment, the object may comprise an individual. The object location component 204 may be arranged to determine a distance for an individual as with any other object, and pass the estimated distance to the virtual information component 124. The virtual information component 124 may utilize facial recognition techniques to identify an individual, and store the identification information and distance information as individual location information.

The individual contact information 216 may comprise any contact information for contacting an individual using one or more communications applications and/or communications modalities. Contact information may include any type of information or identifier used to establish a connection with a device for an individual. Examples of contact information may include without limitation a telephone number, a cellular telephone number, a home telephone number, a business telephone number, a unified telephone number, a network address, an email address, an instant messaging (IM) address, a short messaging system (SMS) address, a multimedia messaging system (MMS) address, a chat address, a group chat address, a universal resource location (URL), a user name, an SNS user name, login information, and so forth. In one embodiment, the contact information may be stored as local information 114 in the data store 222, such as part of a local contact database implemented for a client device. In one embodiment, the contact information may be stored as remote information 112 accessible via the network 220, such as a remote contact database implemented by a remote device (e.g., a network server such as an SNS server).

In one embodiment, the individual contact information 216 may represent contact information for a single individual. In one embodiment, the individual contact information 216 may represent contact information for multiple individuals, such as members of a group, business or entity.

In one embodiment, the individual contact information 216 may also include presence information. Presence information may comprise a status indicator that conveys ability and willingness of a potential communication partner, such as an individual, to communicate. A communication device for an individual may provide presence information (e.g., presence state) via a network connection to a presence service, which is stored in what comprises a personal availability record (called a presentity) and can be made available for distribution to other users (called watchers) to convey availability for communication. Presence information has wide application in many communication services, particularly for IM applications and voice over IP (VoIP) services.

The real object information 218 may comprise any object information about a real object 106-1-a. For instance, the object information may include an object name, an object location, an object product, an object service, an object advertisement, surrounding objects around a target object, and other general or custom object information about a real object 106-1-a. In one embodiment, the object information may be stored as local information 114 in the data store 222, such as part of a local contact database implemented for a client device. In one embodiment, the contact information may be stored as remote information 112 accessible via the network 220, such as a remote contact database implemented by a remote device (e.g., a network server such as a business server).

The augmentation component 128 may augment a virtual object 116-1-b using the various types of information 212, 214, 216 and 218. For instance, the augmentation component 128 may augment a virtual object 116-1-b using the various types of individual information 212, such as a name, home address or business address, for example.

The augmentation component 128 may augment a virtual object 116-1-b using the various types of individual location information 214. For instance, the presence or absence of an augmented object 126-1-c in the augmented image 118 may represent one expression of individual location information 214 for one or more individuals as presented by the augmented image 118. In other words, an augmented object 126-1-c implicitly communicates that an individual is located at a location that coincides with the augmented object 126-1-c. In other cases, an augmented object 126-1-c may explicitly provide individual location information for the augmented object 126-1-c within a graphical object associated with the augmented object 126-1-c.

The augmentation component 128 may augment a virtual object 116-1-b using the various types of individual location information 214, such as a previous, current or future location, for example. In one embodiment, the augmentation component 128 may augment a virtual object 116-1-c with previous and current individual location information. For instance, assume an individual visited a first store represented as a virtual object 116-1 at time ($t_0$) and a second store represented as a virtual object 116-2 at time ($t_1$). The augmentation component 128 may augment the virtual objects 116-1, 116-2 with respective previous and current location information for an individual to form augmented objects 126-1, 126-2. Further, the augmentation component 128 may augment any virtual objects 116-3, 116-4 . . . 116-b with information showing previous location information for the individual, such as a graphic of a line or footsteps illustrating a path between the augmented objects 126-1, 126-2. In addition, the previous and current individual location information may be varied graphically to enhance a viewing experience for the user 101, such as implementing different color schemes for each of the augmented objects 126-1, 126-2 to more easily distinguish between types of location information (e.g., previous and current locations).

In one embodiment, the augmentation component 128 may augment a virtual object 116-1-c with future individual location information. Continuing with the previous example, assume the individual location information 214 represents a determined future location for an individual. The future location may be determined based on tracking past behavior or activities for the individual to identify a pattern, such as vectors of movement for the individual, individual preferences as indicated by the individual information 212 (e.g., store preferences), appointment information for a scheduling application (e.g., meeting at 123 Jefferson Avenue, Washington, D.C.), and so forth. The augmentation component 128 may augment a virtual object 116-1-c with the future location information indicated by the individual location information 214. Continuing with the previous example, assume an individual plans to visit a third store represented as a virtual object 116-3 at time ($t_2$). The augmentation component 128 may augment the virtual objects 116-1, 116-2, 116-3 with respective previous, current and future location information for an individual to form augmented objects 126-1, 126-2, and 126-3. Further, the augmentation component 128 may augment any virtual objects 116-4, 116-4 . . . 116-b with information showing previous location information for the individual, such as a graphic of a line or footsteps illustrating a path between the augmented objects 126-1, 126-2, and future location information for the individual, such as the graphic of a line or footsteps continuing the path between the augmented objects 126-2, 126-3. In addition, the previous, current and future individual location information may be varied graphically to enhance a viewing experience for the user 101, such as implementing different color schemes for each of the augmented objects 126-1, 126-2, 126-3 to more easily distinguish between types of location information (e.g., previous, current and future).

The augmentation system 120 may dynamically continue to augment currently augmented virtual objects 116-1-*b* or other non-augmented virtual objects 116-1-*b* with information for an individual as information for the individual changes. In one embodiment, the augmentation system 120 may augment a virtual object 116-1-*b* with updated information for an individual as information for the individual changes to form an updated augmented object. For instance, assume the augmentation system 120 augments a virtual object 116-4 with presence information for an individual indicating availability for communication as represented by the individual contact information 216 to form a corresponding augmented object 126-4. Further assume the presence information for the individual changes to indicate unavailability for communication. The augmentation system 120 may dynamically update the virtual object 116-4 with the updated presence information to form an updated augmented object 126-4. In another example, assume the location information for an individual changes, such as when the individual moves between offices within an office building. The augmentation system 120 may augment a virtual object 116-5 with a first location for the individual to form an augmented object 126-5, and dynamically update the virtual object 116-5 with a second location for the individual to form an update augmented object 126-5. In cases where movement of an individual causes a switch in virtual objects 116-1-*b*, such as from the virtual object 116-5 to a virtual object 116-6, the augmentation system 120 may revert the augmented object 126-5 back to the virtual object 116-5 and augment the virtual object 116-6 with new location information for the individual to form an augmented object 126-6.

The augmentation system 120 may also further augment currently augmented virtual objects 116-1-*b* with information for an individual based on selection of a corresponding augmented object 126-1-*c*. For instance, assume the augmentation system 120 forms augmented objects 126-1, 126-2 with a first set of information, such as individual information 212 of a name and address. Further assume the user 101 selects the augmented object 126-1 with an input device, such as via a touchscreen display. The augmentation system 120 may further augment the augmented object 126-1 to present a second set of information for the individual, such as contact information for the individual, for example. In one embodiment, the second set of information may be shown simultaneously with the first set of information. In one embodiment, the second set of information may replace the first set of information.

Among the various types of virtual information available for augmenting virtual objects 116-1-*b*, one particularly desirable type of virtual information may comprise contact information for an individual. The augmentation system 120 may generate augmented objects 126-1-*c* to present contact information for an individual either automatically or when an augmented object 126-1-*c* is selected. As such, the augmented image 118 may effectively operate as a user interface for controlling communications with an individual. For instance, the user 101 may review various locations for individuals located within the augmented image 118, such as friends or members within a SNS, as well as contact information and presence information for such individuals. The user 101 may select a contact identifier for an individual when contact information for the individual is presented with the augmented object 126-1-*c*. Once selected, the augmented reality system 100 may send a control directive to a communications application based on the selected contact identifier for the individual. A device implementing the communications application may then launch the communication application using the selected contact identifier to establish communications between the user 101 and the individual associated with the selected contact identifier.

Figure 3:
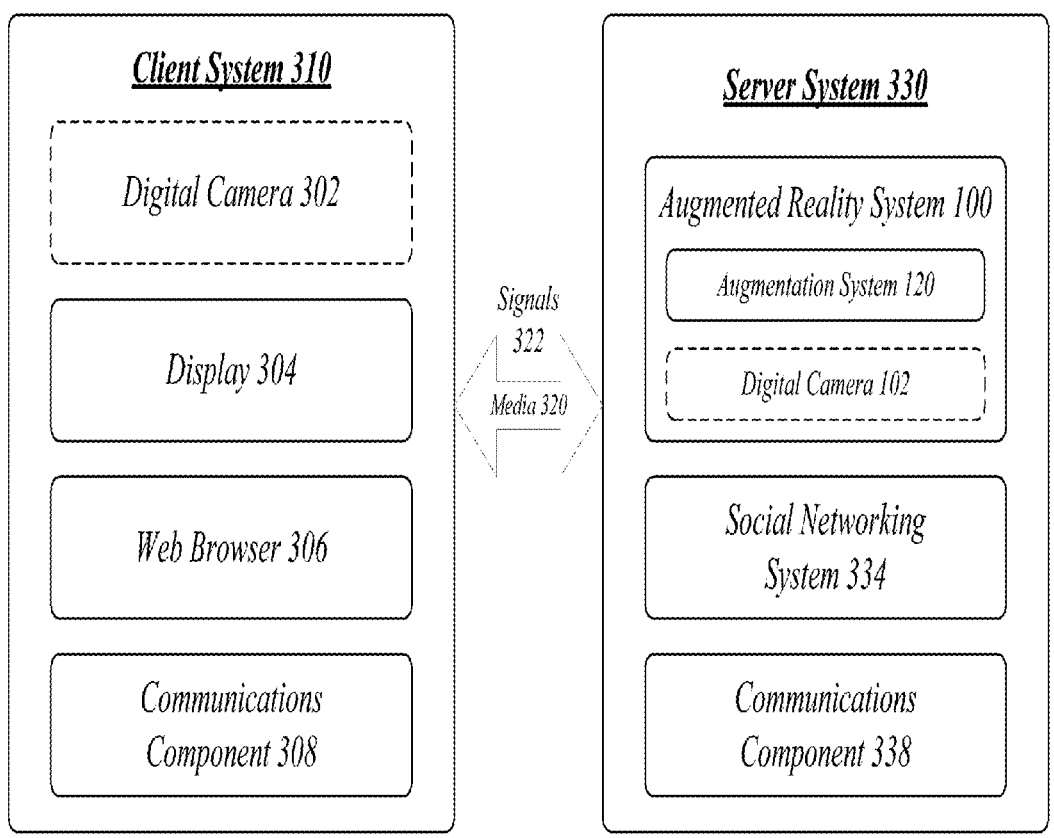
FIG. 3 illustrates an embodiment of a distributed system.

FIG. 3 illustrates a block diagram of a distributed system 300. The distributed system 300 may distribute portions of the structure and/or operations for the systems 100, 200 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 300 may be implemented as a client-server system. A client system 310 may implement a digital camera 302, a display 304, a web browser 306, and a communications component 308. A server system 330 may implement some or all of the augmented reality system 100, such as the digital camera 102 and/or the augmentation system 120, and a communications component 338. The server system 330 may also implement a social networking system (SNS) 334. Additionally or alternatively, the SNS 334 may be implemented by another server system separate from the server system 330.

In various embodiments, the client system 310 may comprise or implement portions of the augmented reality system 100, such as the digital camera 102 and/or the display 110. The client system 310 may comprise or employ one or more client computing devices and/or client programs that operate to perform various client operations in accordance with the described embodiments. Examples of the client system 310 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the augmented reality system 100 as shown in FIG. 1 has a limited number of elements in a certain topology, it may be appreciated that the augmented reality system 100 may include more or less elements in alternate topologies as desired for a given implementation.

In various embodiments, the server system 330 may comprise or employ one or more server computing devices and/or server programs that operate to perform various server operations in accordance with the described embodiments. For example, when installed and/or deployed, a server program may support one or more server roles of the server computing device for providing certain services and features. Exemplary server systems 330 may include, for example, stand-alone and enterprise-class server computers operating a server operating system (OS) such as a MICROSOFT OS, a UNIX® OS, a LINUX® OS, or other suitable server-based OS. Exemplary server programs may include, for example, communications server programs such as MICROSOFT WINDOWS LIVE® or MICROSOFT OFFICE COMMUNICATIONS SERVER (OCS) for managing incoming and outgoing messages, messaging server programs such as MICROSOFT EXCHANGE SERVER for providing unified messaging (UM) for e-mail, voicemail, VoIP, instant messaging (IM), group IM, enhanced presence, and audio-video conferencing, and/or other types of programs, applications, or services in accordance with the described embodiments.

In one embodiment, the server system 330 may implement the SNS 334. The SNS 334 may generally comprise any application or service provided to establish an electronic or online social network between members of the SNS 334. The SNS 334 may provide an online software platform accessible via a network to publish, distribute, disseminate, share or otherwise communicate information between related members over the network. Examples for the SNS 334 may include without limitation MICROSOFT® WINDOWS LIVE®, MYSPACE®, FACEBOOK®, LINKEDIN®, TWITTER®, BEBO® and other social networking systems and services consistent with the described embodiments. The embodiments are not limited in this context.

The client system 310 and the server system 330 may communicate with each other a communications media 320 using communications signals 322. In one embodiment, for example, the communications media may comprise a public or private network. In one embodiment, for example, the communications signals 322 may comprise wired or wireless signals. Computing aspects of the client system 310 and the server system 330 may be described in more detail with reference to FIG. 7. Communications aspects for the distributed system 300 may be described in more detail with reference to FIG. 8.

The distributed system 300 illustrates an example where the client system 310 implements input and output devices for the augmented reality system 100, while the server system 330 implements the augmentation system 120 to perform augmentation operations. As shown, the client system 310 may implement the digital camera 302 and the display 304 may be the same or similar as the digital camera 102 and the display 110 as described with reference to FIG. 1. The client system 310 may use the digital camera 302 to send or stream images 108 to the server system 330 as communications signals 322 over the communications media 320 via the communications component 308. The server system 330 may receive the images 108 from the client system 310 via the communications component 338, and perform augmentation operations for the images 108 to produce the augmented images 118 via the augmentation system 120 of the augmented reality system 100. The server system 330 may send the augmented images 118 as communications signals 322 over the communications media 320 to the client system 310. The client system 310 may receive the augmented images 118, and present the augmented images 118 on the display 304 of the client system 310.

The distributed system 300 also illustrates an example where the client system 310 implements only an output device for the augmented reality system 100, while the server system 330 implements the digital camera 102 to perform image capture operations and the augmentation system 120 to perform augmentation operations. In this case, the server system 330 may use the digital camera 102 to send or stream images 108 to the augmentation system 120. The augmentation system 120 may perform augmentation operations for the images 108 to produce the augmented images 118. The server system 330 may send the augmented images 118 as communications signals 322 over the communications media 320 to the client system 310 via the communications component 308, 338. The client system 310 may receive the augmented images 118, and present the augmented images 118 on the display 304 of the client system 310.

In the latter example, the augmented reality system 100 may be implemented as a web service accessible via the web browser 306. For instance, the user 101 may utilize the client system 310 to view augmented images 118 as provided by the augmented system 100 implemented by the server system 330. Examples of suitable web browsers may include MICROSOFT INTERNET EXPLORER®, GOOGLE® CHROME and APPLE® SAFARI, to name just a few. The embodiments are not limited in this context.

Figure 4:
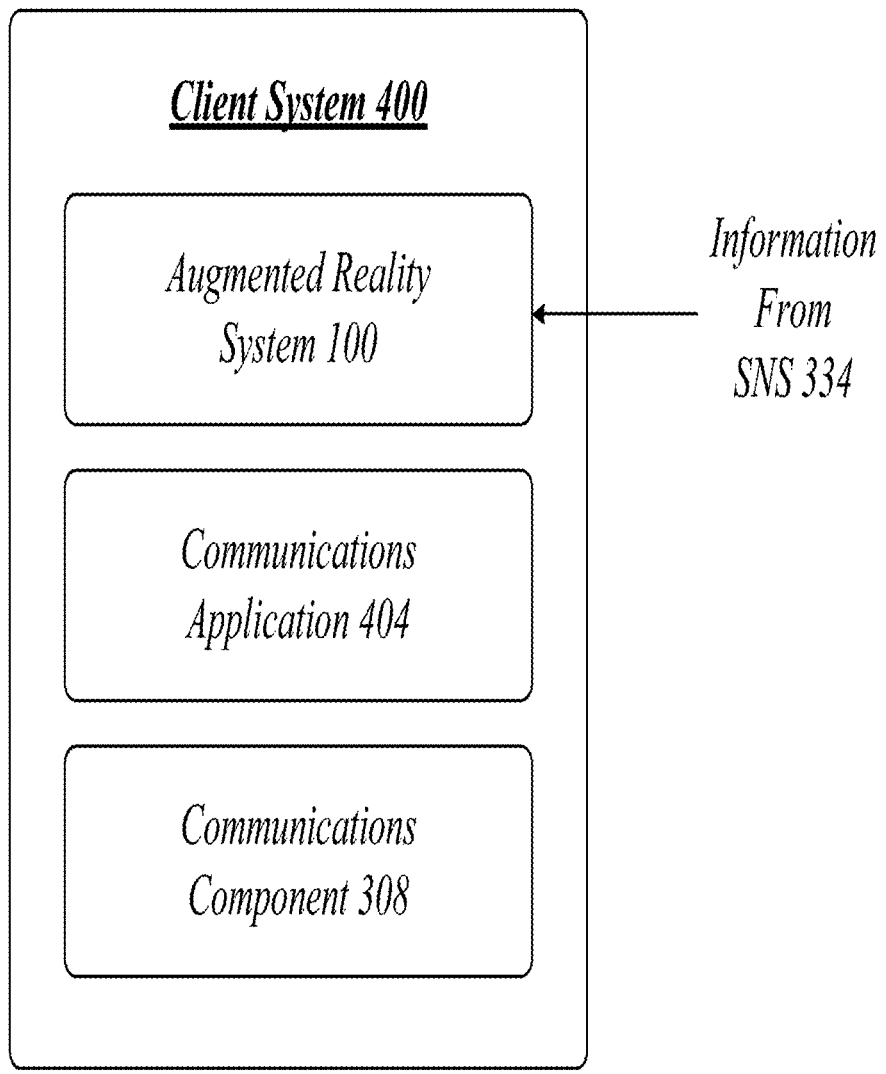
FIG. 4 illustrates an embodiment of a centralized system.

FIG. 4 illustrates a block diagram of a client system 400. The client system 400 may implement all of the structure and/or operations for the systems 100, 200 in a single computing entity. In one embodiment, for example, the client system 400 may implement the structure and/or operations for the systems 100, 200 entirely within a single computing device. The client system 400 may be representative of, for example, the client system 310 modified to include the augmented reality system 100 and one or more communications applications 404.

In the illustrated embodiment shown in FIG. 4, the client system 100 may comprise or implement the augmented reality system 100, a communications application 404, and a communications component 308. The communications application 404 may comprise any type of communications application for communicating with a device. Examples for the communications applications 404 may include without limitation a phone application and a messaging application. Examples of messaging applications may include without limitation a unified messaging (UM) application, an e-mail application, a voicemail application, an instant messaging (IM) application, a group IM application, presence application, audio-video conferencing application, short message service (SMS) application, multimedia message service (MMS) application, facsimile application and/or other types of messaging programs, applications, or services in accordance with the described embodiments.

As previously described, the augmentation system 120 may generate augmented objects 126-1-c to present contact information for an individual either automatically or when an augmented object 126-1-c is selected. As such, the augmented image 118 may effectively operate as a user interface for controlling communications with an individual. For instance, the user 101 may review various locations for individuals located within the augmented image 118, such as friends or members within a SNS, as well as contact information and presence information for such individuals. The user 101 may select a contact identifier for an individual when contact information for the individual is presented with the augmented object 126-1-c. Once selected, the augmented reality system 100 may send a control directive to the communications application 404 based on the selected contact identifier for the individual. The client system 400 implementing the communications application 404 may then launch the communication application 404 using the selected contact identifier to establish communications between the user 101 and the individual associated with the selected contact identifier.

Figure 5A:
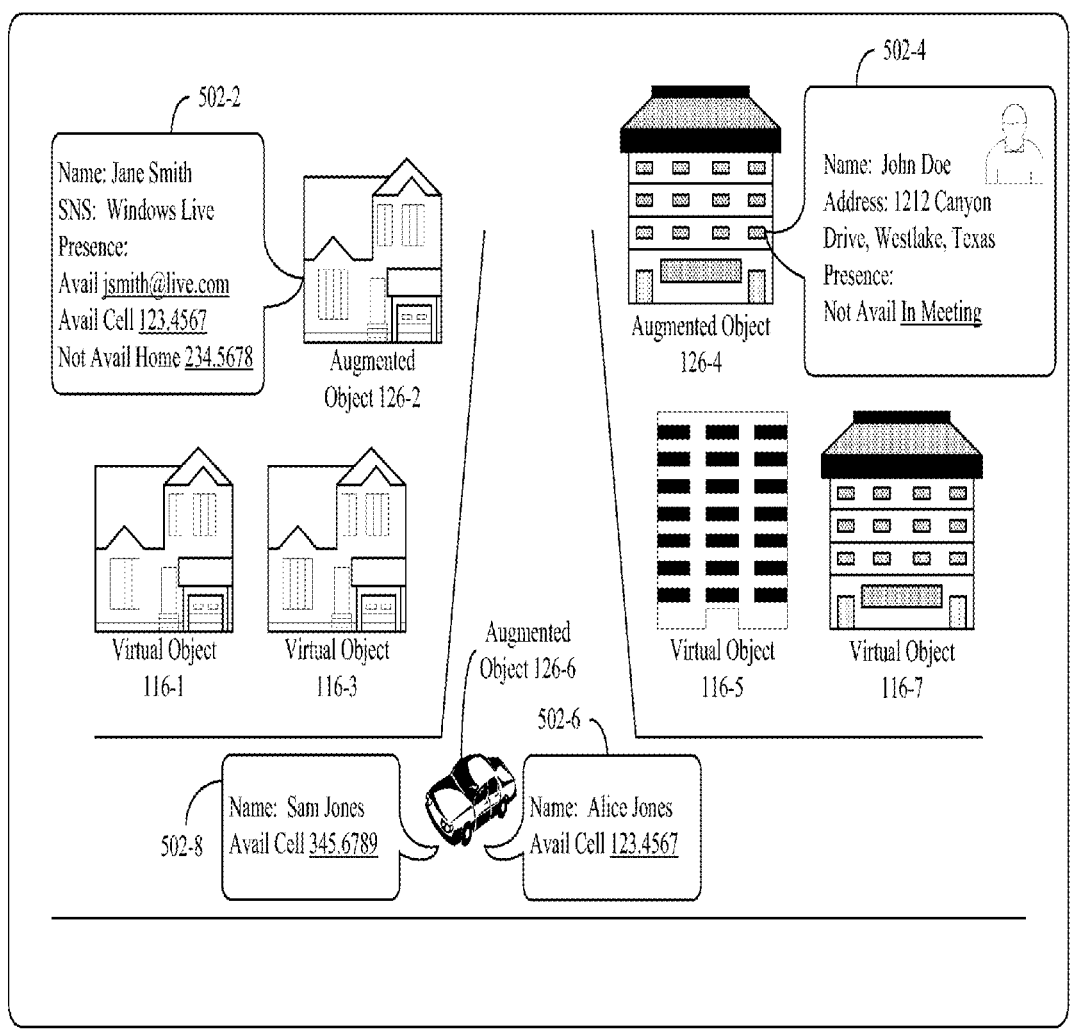
FIG. 5A illustrates an embodiment of a first augmented image.

FIG. 5A illustrates an GUI view of an augmented image 500. The augmented image 500 may comprise an example for the augmented image 118. The augmented image 500 as shown in FIG. 5A may comprise various virtual objects 116-1, 116-3, 116-5 and 116-7. Virtual objects 116-2, 116-4 and 116-6 have been augmented and replaced by corresponding augmented objects 126-2, 126-4 and 126-6. Each of the augmented objects 126-2, 126-4 and 126-6 may each present a set of information about different individuals using corresponding graphical objects 502-1-*d*, such as respective graphical objects 502-2, 502-4 and 502-6.

As shown, the augmented object 126-2 may present a graphical object 502-2 with various types of information for an individual named "Jane Smith." The graphical object 502-2 may contain such individual information 212 as a SNS for "Jane Smith," such as MICROSOFT WINDOWS LIVE. The graphical object 502-2 may further present individual contact information 216, including contact identifiers such as "jsmith@live.com," a cellular telephone number of "123.4567," and a home telephone number of "234.5678." The contact information 216 may further comprise presence information for each contact identifier indicating whether "Jane Smith" is available to communicate using each of the respective contact identifiers (e.g., "Avail" or "Not Avail.") It may be appreciated that other types of information may be presented for a graphical object 502-1-*d*, such as pictures, icons, control buttons, radio buttons, and other GUI elements. For instance, the presence information for "Jane Smith" may be conveyed using GUI elements represented as icons presenting a green circle for "Avail" and a red circle for "Not Avail." The embodiments are not limited in this context.

The augmented object 126-4 may present a graphical object 502-4 with various types of information for an individual named "John Doe." It is worthy to note that the information presented by the graphical object 502-4 is different from the information presented by the graphical object 502-2. For instance, the graphical object 502-2 includes an address for "John Doe," a picture for "John Doe," and more detailed presence information. It may be appreciated that in some implementations the types of information may be uniform for all graphical objects 502-1-*d*.

The augmented object 126-6 is different from the augmented objects in a couple of respects. First, the augmented object 126-6 is represented as a vehicle rather than a home or building as for respective augmented objects 126-2, 126-4. Second, the augmented object 126-6 may present multiple graphical objects 502-6, 502-8 with various types of information for multiple individuals, one named "Alice Jones" and the other "Sam Jones." As with the graphical objects 502-2, 502-4, the graphical objects 502-6, 502-8 may present contact information and presence information for the respective individuals "Alice Jones" and "Sam Jones." As such, the augmented object 126-6 represents a case where individual location information 214 for multiple individuals substantially match object location information for a real object 106-6 as represented by a virtual object 116-6 and augmented to form the augmented object 126-6.

Figure 5B:
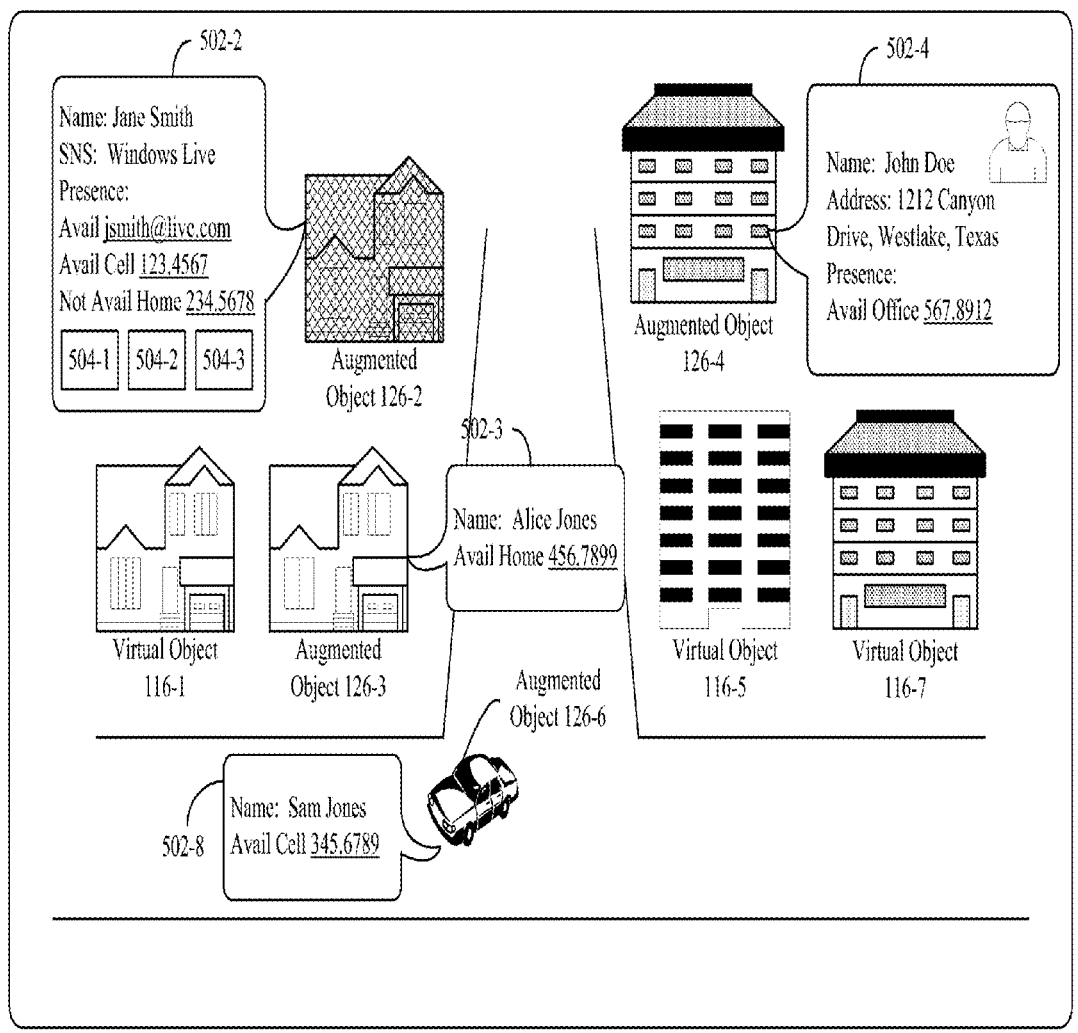
FIG. 5B illustrates an embodiment of a second augmented image.

FIG. 5B illustrates a GUI view of an updated augmented image 510. The updated augmented image 510 may comprise an example of an updated version of the augmented image 500. As with the augmented image 500 as shown in FIG. 5A, the augmented image 510 may comprise various virtual objects 116-1, 116-5 and 116-7, and augmented objects 126-2, 126-4 and 126-6.

The updated augmented image 510, however, illustrates a case where the augmented image 500 is updated to reflect a change in individual location information. For instance, assume the individual "Alice Jones" moves from the vehicle represented by the augmented object 126-6 to her house represented by the virtual object 116-3 as shown in the augmented image 500 of FIG. 5A. In the updated augmented image 510, the virtual object 116-3 has been augmented and replaced by a corresponding augmented object 126-3 having a corresponding graphical object 502-3. The update augmented image 510 may represent a case where individual location information 214 for "Alice Jones" has been updated and substantially matches object location information for the real object 106-3 as represented by a virtual object 116-3 and augmented to form the augmented object 126-3. Note that the individual contact information 216 has been modified from a cellular telephone number of "123.4567" to a home telephone number of "456.7899."

The updated augmented image 510 also illustrates a case where the augmented image 500 is updated to reflect a change in individual information for an individual. For instance, assume the individual "John Doe" is no longer in a meeting as previously indicated by the graphical object 502-4 of the augmented object 126-4. The presence information for the graphical object 502-4 may be updated to reflect new presence information indicating "John Doe" is available for communication at office telephone number "567.8912."

The updated augmented image 510 further illustrates a case where the augmented image 500 is updated to reflect a selection of an augmented object 126-1-*c* to reveal additional information about an individual. For instance, assume the user 101 selects the augmented object 126-2, as indicated by the change in pattern for the augmented object 126-2 from the augmented image 500 to the updated augmented image 510. Selecting the augmented object 126-2 may expand the graphical object 502-2 to display additional information about the individual "Jane Smith," such as additional photographs 504-1, 504-2 and 504-3 published by "Jane Smith" on the SNS 334 of MICROSOFT WINDOWS LIVE.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein, such as the augmentation system 120, for example.

In the illustrated embodiment shown in FIG. 6, the logic flow 600 may receive an image having a virtual object representing a real object at block 602. For example, the augmentation system 120 may receive an image 108 having a virtual object 116-1 representing a corresponding real object 106-1. The image 108 may be generated by one of the digital cameras 102, 302.

The logic flow 600 may determine location information for the real object in the image at block 604. For example, the object location component 204 of the location component 122 may determine object location information for the real object 106-1 in the image 108. The object location information may be determined via the remote information 112 or as generated by the object location component 204 using various machine vision or computer vision techniques.

The logic flow 600 may retrieve location information for an individual at block 606. For example, the virtual information component 124 may retrieve individual location information 214. The individual location information 214 may be retrieved from a remote device, such as remote information 112 retrieved from the server system 330 over the network 220. The individual location information 214 may also be generated by the object location component 204 using various machine vision or computer vision techniques.

The logic flow 600 may determine when the location information for the real object substantially matches the location information for the individual at block 608. For example, the proximity component 126 may determine when the object location information for the real object 106-1 substantially matches the individual location information for the individual. A substantial match may be determined using a proximity parameter representing a distance between the object location information and individual location information.

The logic flow 600 may augment the virtual object with information for the individual to form an augmented object at block 610. For example, the augmentation component 128 may augment the virtual object 116-1 with information for the individual to form an augmented object 126-1. The information may comprise location information and/or contact information. The rendering component 130 may receive the image 108 and the augmented object 126-1, and render the augmented image 118 with the augmented object 126-1 either alone or with other augmented objects 126-2, 126-3 . . . 126-c and/or one or more virtual objects 116-2, 116-3 . . . 116-b.

Figure 7:
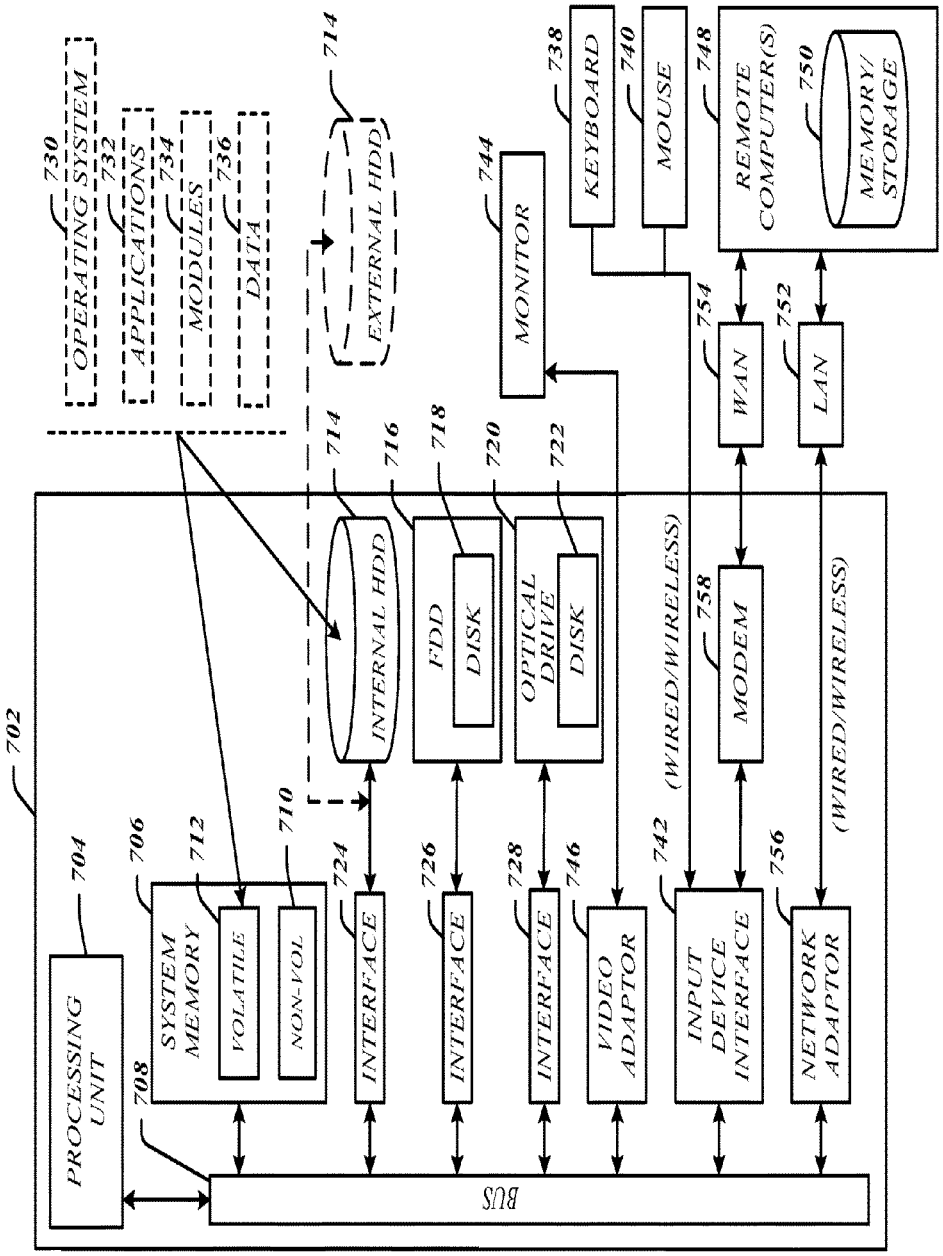
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the augmentation system 120, the client systems 310, 400, and the server system 330.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
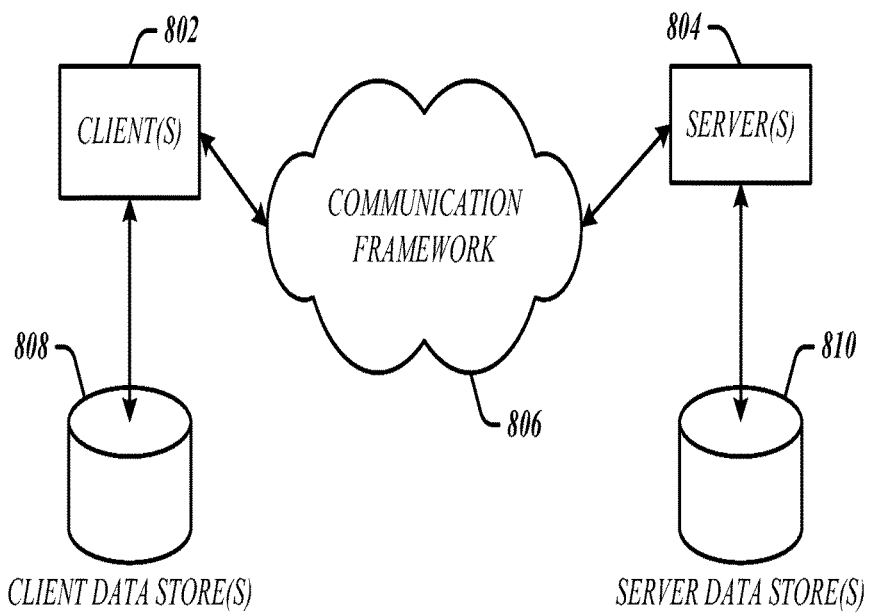
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
receiving an image having a virtual object representing a real object;
determining location information for the real object in the image;
retrieving location information comprising at least a first location and a second location associated with an individual;
determining when the location information for the real object substantially matches the location information for the individual;
augmenting the virtual object with information for the individual from a content source to form an augmented object; and
rendering an augmented image with the augmented object and graphical variations to distinguish between the first location associated with the individual and the second location associated with the individual.

2. The computer-implemented method of claim 1, wherein the augmented object is graphically enhanced and a second virtual object in the augmented image is graphically subdued.

3. The computer-implemented method of claim 1 wherein the first location for the individual comprises a future location or a current location.

4. The computer-implemented method of claim 1, comprising augmenting the virtual object or another virtual object with information for the individual as the location information for the individual changes.

5. The computer-implemented method of claim 1, comprising augmenting the virtual object with updated information for the individual as information for the individual changes to form an updated augmented object.

6. The computer-implemented method of claim 1, comprising determining a future location for the individual based at least in part on at least one of information tracking past behavior or activities for the individual to identify a pattern, information indicating individual preferences, or appointment information for a scheduling application.

7. The computer-implemented method of claim 1, comprising presenting additional information for the individual when the augmented object is selected with an input device.

8. The computer-implemented method of claim 1, comprising augmenting the virtual object with respective previous, current and future location information for the individual.

9. The computer-implemented method of claim 1, comprising selecting a contact identifier for the individual when contact information for the individual is presented with the augmented object.

10. The computer-implemented method of claim 9, comprising launching a communication application using the selected contact identifier to establish communications with the individual associated with the selected contact identifier.

11. An article comprising storage hardware containing instructions that when executed enable a system to:
receive an image having a virtual object representing a real object;
determine location information for the real object in the image;
retrieve location information for an individual;
modify the virtual object with online information for the individual to form a modified virtual object when the location information for the real object substantially matches the location information for the individual; and
render an augmented image with the modified virtual object and a second virtual object that is not augmented with any information for the individual wherein the modified virtual object is graphically enhanced and the second virtual object is graphically subdued.

12. The article of claim 11, further comprising instructions that when executed enable the system to render the augmented image with the modified virtual object to distinguish at least one of between a future location and a current location for the individual or between the current location and a previous location for the individual.

13. The article of claim 11, further comprising instructions that when executed enable the system to perform at least one of modifying the modified virtual object or another virtual object with information for the individual as the location information for the individual changes or modifying the modified virtual object with updated information for the individual as the online information for the individual changes.

14. The article of claim 11, further comprising instructions that when executed enable the system to determine when the location information for the real object substantially matches the location information for the individual based on a proximity parameter, the proximity parameter comprising a configurable value representing a measure of distance between a location for the real object and a location for the individual and having a precision based on a size of the individual or the real object.

15. The article of claim 11, further comprising instructions that when executed enable the system to send a control directive to initiate a communications application based on a selected contact identifier for the individual when contact information for the individual is presented with the modified virtual object.

16. An apparatus comprising at least one processor and memory comprising:
   an augmentation system, executing on the at least one processor, operative to augment an image with information for an individual, the image having a virtual object representing a real object, the augmentation system comprising:
      a location component operative to determine location information for the real object;
      a virtual information component operative to retrieve current location information for an individual;
      a proximity component operative to determine whether location information for the real object substantially matches the current location information for the individual;
      an augmentation component operative to augment the virtual object with social networking information for the individual to form an augmented object when the location information for the real object substantially matches the current location information for the individual; and
      a rendering component operative to render an augmented image with the augmented object.

17. The apparatus of claim 16, the rendering component operative to render the augmented image with only augmented objects.

18. The apparatus of claim 16, comprising a display communicatively coupled to a digital camera and the augmentation system, the display operative to display the augmented image with the augmented object having previous location information, the current location information, and previous location information varied graphically.

19. The apparatus of claim 16, comprising an input device operative to select the augmented object to display organization information about the individual.

20. The apparatus of claim 16, comprising a communication application operative to communicate with a device for the individual when the augmented object is selected by an input device.

\* \* \* \* \*